Jan. 5, 1926.
C. E. HUTCHINGS
BELLOWS SUPPORT FOR CAMERAS
Filed April 14, 1924
1,568,670
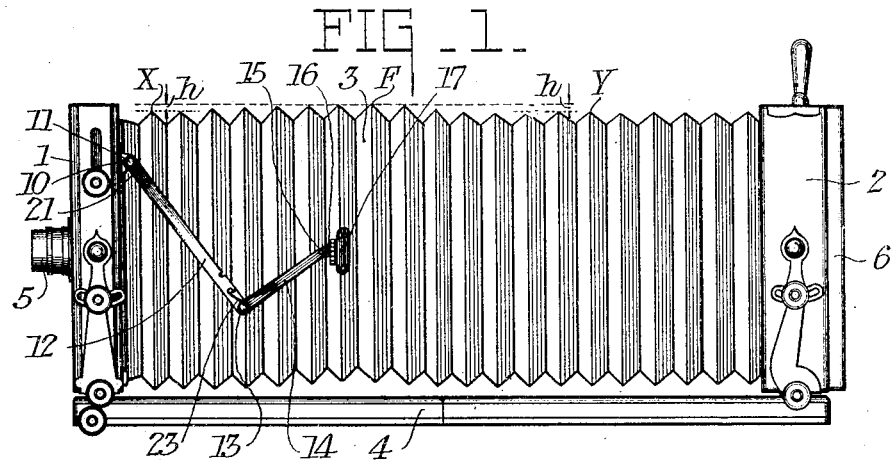
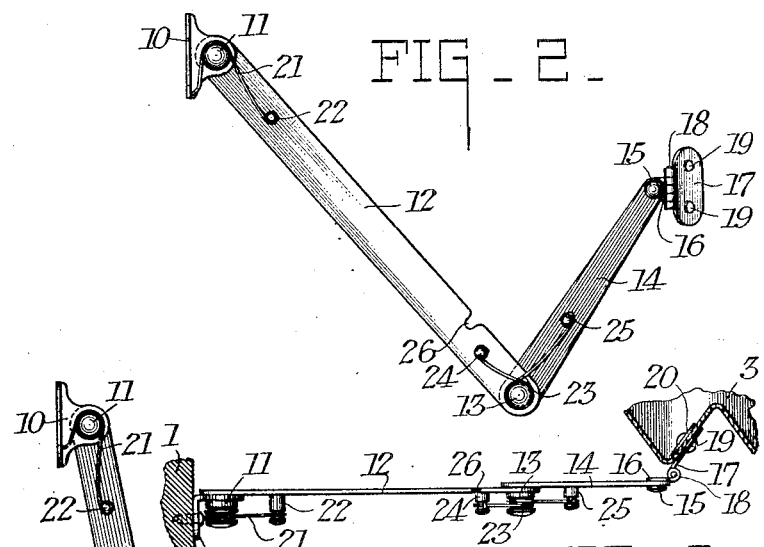
INVENTOR,
Charles E. Hutchings,
BY R. L. Stinchfield,
Donald H. Stewart.
ATTORNEYS.

Patented Jan. 5, 1926.

1,568,670

UNITED STATES PATENT OFFICE.

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

BELLOWS SUPPORT FOR CAMERAS.

Application filed April 14, 1924. Serial No. 706,580.

*To all whom it may concern:*

Be it known that I, CHARLES E. HUTCHINGS, a citizen of the United States of America, residing at Rochester, in the county of Monroe and State of New York, have invented certain new and useful Improvements in Bellows Supports for Cameras, of which the following is a full, clear, and exact specification.

This invention relates to photography and more particularly to photographic cameras. It has for its object to provide a support for the camera bellows; another object is to provide a bellows support having a greater lifting power when the bellows is extended than when the bellows is collapsed; another object is to provide a support consisting of a simple linkage which will not interfere with any of the usual camera movements and one which may be provided as an attachment for cameras; and other objects will appear from the following specification, the novel features being pointed out in the claims at the end thereof.

In the drawings wherein like reference characters denote like parts throughout:

Fig. 1 is a side elevation of a camera equipped with a bellows support constructed in accordance with and illustrating one form of my invention;

Fig. 2 is an enlarged side elevation of the supporting linkage removed from the camera;

Fig. 3 is a plan view of the parts shown in Fig. 2;

Fig. 4 is a side elevation of the parts in a folded or collapsed position;

Fig. 5 is a diagram showing the spring action upon the links.

The usual camera consists of two frames 1 and 2 supporting between them a bellows 3. There is a bed 4 supporting the two frames. One frame carries a lens 5 and the other the usual back 6 in which a plate holder or ground glass frame can be carried.

In order to support the bellows between the frames 1 and 2 I provide a supporting linkage, which, in the preferred embodiment shown consists of a bracket 10 which may be attached to the frame 1, carrying, upon pivot 11, a link 12. This link carries a pivot 13 upon which a second link 14 is supported, the other end of this link being pivoted at 15 to member 16 which is hinged to member 17 by the pintle 18. Obviously this linkage may be carried by either the front or back frame. Member 17 may be attached to the bellows 3 by rivets 19 fastened to plate 20 inside of the bellows, as shown in Fig. 3. Two similar linkages are provided, one on each side of the camera.

Pivot 11 is in the form of a headed stud and is encircled by spring 21 which has one end resting against the bracket 10 and the other engaging a pin 22 carried by link 12. The spring tends to raise the opposite end of the link, turning it (in the form shown in this drawing) in a counter-clockwise direction as indicated by the arrow A, Fig. 5.

Pivot 13 is similar to 11, and is encircled by spring 23 having one end pressing on pin 24 carried by link 12, and the other end engaging pin 25 carried by link 14. This spring tends to draw the pins together as indicated by arrow B, Fig. 5. In the folded position pin 25 comes to rest in notch 26 of link 11, thus being brought to a stop.

The stop 25—26 is arranged to render spring 23 inoperative after the bellows is collapsed to a predetermined degree, so that the sole supporting force is through spring 21 when the parts are in the position shown in Fig. 4. The lifting power of the supporting linkage is greater when the bellows and linkage is extended since both springs then are brought into operation. As angle *a* (Fig. 5) is increased both springs are acting more directly in a line opposing the bellows sag. Obviously when the linkage is in the position shown in Fig. 4, but little lifting force is applied to the bellows.

I contemplate providing this linkage as a built-in feature for cameras or as an attachment for cameras on the market. It can be readily attached by an unskilled person.

I have found that a support constructed as above described does not distort and adequately supports the bellows. In the view camera shown in the drawing the uppermost fold F in a bellows 30 inches long was held more than ⅛ of an inch higher (as indicated at *h*) than the folds at X and Y. The camera described is an 8 x 10 inch. The figures are given as illustrative only, and I do not wish to be restricted by them in any way, for obviously such a supporting linkage is applicable to many kinds of different sized cameras.

While I have described a preferred embodiment of my invention, I am aware that different embodiments can be made by those skilled in the art, and I contemplate as within the scope of my invention all such changes as may come within the scope of the following claims.

Having thus described my invention, what I claim as new and desire to secure by Letters Patent is:

1. In combination with a camera frame and bellows, a bellows support connecting the camera frame and bellows including pivoted links, means associated with the links for resisting bellows sag.

2. In combination with a camera frame and bellows, a bellows support connecting the frame and bellows including links pivoted together, and springs associated with the links for resisting bellows sag.

3. In combination with a camera frame and bellows, a bellows support including pivoted links, one link pivoted to the frame, and the other link pivoted to the bellows, and springs encircling two pivots and acting upon the links to support the bellows.

4. In combination with a camera frame and bellows, a bellows support including pivoted links attached to the frame and bellows, and springs acting upon the links tending to raise the bellows and draw it toward the bellows support.

5. In combination with a camera frame and bellows, a bellows supporting device comprising a link pivoted to the frame, a second link pivoted to the first mentioned link at one end and hinged to the bellows at the other, a spring tending to swing the first link upwardly about its pivot, a second spring adapted to swing the second link about its pivot in the same direction as the first link is turned by its spring, whereby the bellows support thus formed tends to resist bellows sag.

6. In combination with a camera frame and bellows, a bellows supporting structure including a pair of pivoted links, springs for actuating the links, one spring acting upon one link tending to raise the bellows, and the other spring acting upon the other link tending to move the bellows at an angle to the first mentioned direction.

7. In combination with a pair of relatively separable camera frames and a bellows connecting these frames, a bellows supporting structure including pivoted links, two springs associated with the links, one spring exerting a lifting force upon the bellows irrespective of the position of the camera frames, and the other spring exerting a progressively greater lifting force upon the bellows as the camera frames are separated to extend the bellows.

8. In combination with a camera frame and an extensible bellows, a bellows supporting link associated with the bellows, means cooperating with the bellows supporting link tending to raise the bellows, said means having greater lifting power when the bellows is extended than when the bellows is contracted.

9. In combination with a camera frame and an extensible bellows, a bellows supporting linkage, springs acting upon the linkage, one spring tending to raise the bellows when the bellows is in one position and both springs tending to raise the bellows when extended.

10. In combination with a camera frame and an extensible bellows, a bellows supporting linkage adapted to fold and unfold, springs actuating the linkage to support the bellows, the springs being arranged to exert a greater lifting force upon the bellows when the linkage is unfolded than when the linkage is folded.

11. In combination with a camera frame and an extensible bellows, a bellows supporting linkage adapted to fold and unfold, springs actuating the linkage to support the bellows, and also exerting a force upon the links tending to cause the links to unfold.

Signed at Rochester, New York, this 9th day of April 1924.

CHARLES E. HUTCHINGS.